March 24, 1959     C. N. WINKELMAN     2,878,908
AUTOMOTIVE VEHICLE FOOT PEDALS
Filed Dec. 14, 1956
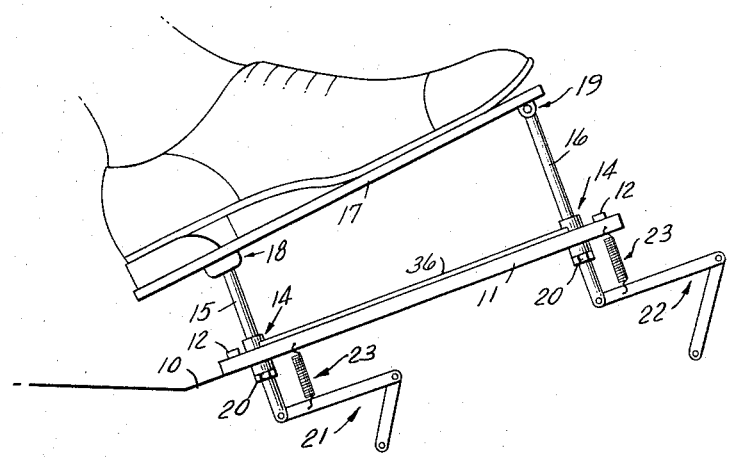
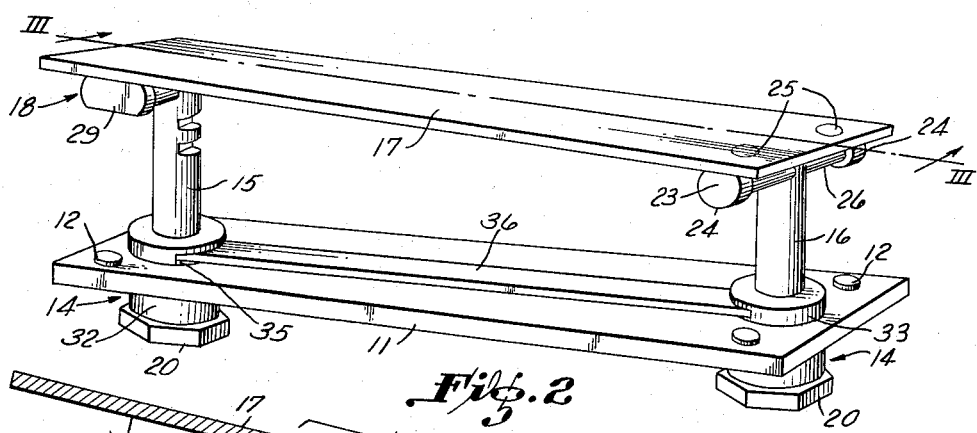
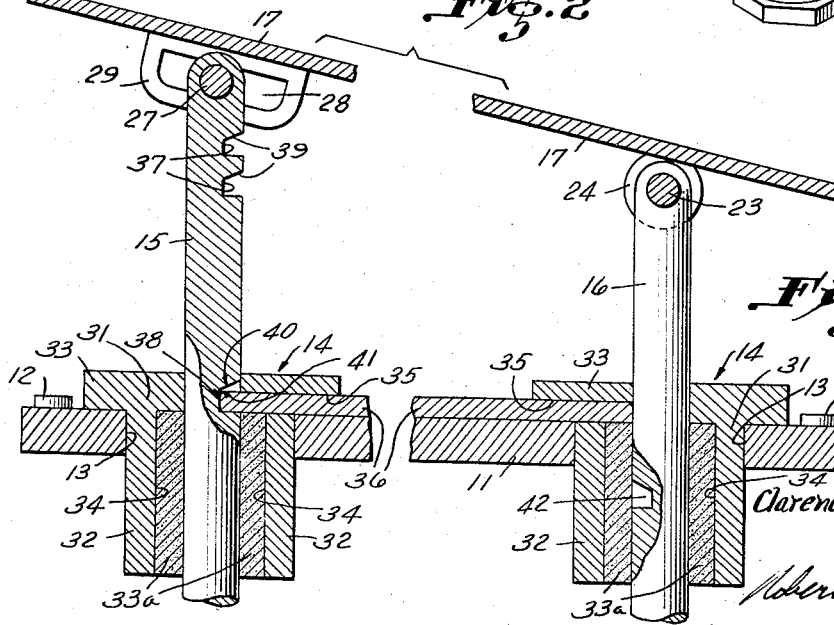
INVENTOR
Clarence N. Winkelman
BY     ATTORNEY

United States Patent Office 2,878,908
Patented Mar. 24, 1959

2,878,908

AUTOMOTIVE VEHICLE FOOT PEDALS

Clarence N. Winkelman, Topeka, Kans.

Application December 14, 1956, Serial No. 628,279

1 Claim. (Cl. 192—3)

This invention relates to a foot pedal control device for use in connection with automotive vehicles of all types, and to improvements in such devices.

In conventional automobiles commonly in use today, acceleration control of the same is provided by a foot pedal mounted on the floorboard of the automobile and linked to the throttle mechanism thereof. Braking control for automobiles is provided by a separate foot pedal, usually mounted adjacent to the throttle pedal. One object of my invention is to provide a single foot pedal for control of both acceleration and braking of the automobile in which it is used.

Under ordinary circumstances the automobile is readily controllable, so far as acceleration and deceleration are concerned, by means of two separate pedals. In the case, however, of disabled or crippled drivers, it is frequently impossible for the driver to transfer his right foot from accelerator to brake pedal, or the reverse, rapidly enough to control the automobile under modern traffic conditions. One object of my invention is to provide a device that will enable such persons to safely control their automobiles.

In the circumstance, moreover, of the necessity for an emergency or "crash" stop from a relatively high speed, the fact that the brake pedal is separate and spaced apart some distance from the accelerator pedal causes a definite time lag between the instant when the driver recognizes the necessity for a stop and the instant when he is able to apply pressure to the brake pedal of his automobile. One of the primary objects of my invention is to reduce that time lag materially. My invention also eliminates the danger of the right foot missing or slipping off the brake pedal.

Further, in the circumstance of the necessity for an intersection stop when the automobile is headed uphill, there is a definite time lag between the instant when, being ready to start his automobile after such intersection stop, the driver removes his foot from the brake pedal, and the instant when he applies pressure to the accelerator pedal. This time lag oftentimes results in the automobile rolling a short distance back downhill and then starting forward with a jerk, thereby putting unusual stress or strain on the drive mechanism of the automobile. A further object of the invention is to substantially reduce this time lag, and, indeed, to virtually eliminate the same so that there is no material rollback of the automobile after an intersection stop on a hill, and no undue stress or strain on the driving mechanism of the automobile.

Another object of the invention is to provide brake locking means whereby the brakes of the automobile may be locked in holding position by operation of the same foot pedal device as is used to accelerate and brake the automobile.

A further object of my invention is to provide such a foot pedal device which is entirely safe, even for the uninstructed to operate, in that it embodies positive means to prevent simultaneous pressure on the brake and on the accelerator of the automobile.

Another object of the invention is to provide a device that embodies the attainment of all these objects, and which, at the same time, is simple and inexpensive in construction and operation; that is easy to understand, operate and become accustomed to; and that may, with a minimum of modification in the construction and arrangement of the parts of conventional automobiles, readily be installed in the same.

With these and other objects in view, this invention consists in certain novel features of construction, combination, and arrangement of parts to be hereinafter more fully described and claimed. For a complete understanding of my invention, reference is made to the following description and the accompanying drawings in which:

Fig. 1 is a side elevation of the device of my invention, showing the same in non-operative position mounted on the floor board of an automobile with the driver's foot in place;

Fig. 2 is a perspective view of the device, free of the automobile, and in accelerator actuating position; and Fig. 3 is a sectional view taken on line III—III of Fig. 2.

As is shown most clearly in Fig. 1, the device of my invention is adapted to be mounted on the upwardly sloping portion of an automobile floor board 10, and the foot pedal device itself comprises, in its principal components: a base plate 11 which may be fixed on the floor board 10 in any suitable manner as by bolts 12, said base plate being rectangular in shape with the long axis thereof parallel to the long axis of the automobile, and having, spaced apart along said long axis of said plate 11 and at opposite ends thereof, two holes 13 (see Fig. 3) in which are mounted bushings generally designated 14 to be more particularly described hereinafter; cylindrical plunger rods 15 and 16 slideably and reciprocably mounted in said bushings 14 at the rear and front holes 13 respectively; a foot plate 17 pivotally mounted as at 18 and 19 on the rods 15 and 16 respectively; and stops 20 fixed on rods 15 and 16 engaging the lower ends of bushings 14 so as to limit the upward movement of said rods 15 and 16. Said stops 20 may take the form, as shown, of nuts, screwed on threaded portions of rods 15 and 16.

The rear plunger rod 15 is connected as by suitable linkage 21 to the hydraulic or power braking system of the vehicle, and the front plunger rod 16 is connected as by suitable linkage 22 to the accelerator mechanism of the vehicle.

Spring means, indicated at 23, are provided in the brake and accelerator linkages 21 and 22 to bias the rods 15 and 16 upwardly so as to maintain the foot plate 17 in elevated position, above the floor board 11 as illustrated in Fig. 1.

Referring now more particularly to Figs. 2 and 3, it will be seen that there is, fixed across the upper end of accelerator plunger rod 16, a cross bar 23 transverse of the long axis of the device. The outer ends of said cross bar 23 are mounted in bearings 24 which are fixed as by countersunk bolts 25 to foot plate 17. Sleeves 26 are slideably mounted on the arms of cross bar 23 for low-friction rotatable bearing between said cross bar 23 and the foot plate 17.

Referring now to Fig. 3, it will be seen that there is, fixed across the upper end of brake plunger rod 15 a cross bar 27 disposed similarly to the manner in which cross bar 23 is disposed, with the outer ends of said cross bars 27 slideably mounted in guide slots 28 which are cut in the oppositely facing inner sides of guide plates 29. Guide plates 29 are fixed by any suitable means, as by welding, to the foot plate 17. Cylindrical sleeves 30 are slideably mounted on the arms of cross bar 27 between brake plunger rod 15 and guide plates 29 for low-friction rotatable bearing between cross bar 27 and foot plate 17.

It will be readily appreciated from the foregoing that when either of the opposite ends of foot plate 17 is moved up or down, such movement is not inhibited by any noticeable amount of friction, binding, or pulling as the brake plunger rod cross piece 27 slides longitudinally of the device and pivots in guide slots 28, and as accelerator plunger rod cross pieces 23 pivots in bushings 24, and as sleeve bushings 30 and 26 roll on the under side of foot plate 20.

Referring further to Fig. 3, it will be seen that each bushing generally designated 14 comprises: an outer bushing 31 having a cylindrical shank 32 and a cylindrical shoulder 33 integral with said shank, said outer bushing 31 being made preferably of steel; and an inner cylinder bushing 33a, preferably made of graphite-impregnated bronze, and pressed into a cylindrical cut-out 34 in the inner portion of cylindrical shank 32. Oppositely facing aligned portions of shoulders 33 are cut out, as at 35, in approximately the lower half thereof.

A flat, elongated detent bar or lock bar, 36, made preferably of surgical steel, is slideably mounted on the top surface of plate 11, with the ends of bar 36 retained within the confines of cutouts 35 in bushings 14.

It will be seen that brake plunger rod 15 has cut, in the front side thereof, three slots or notches: two upper notches 37 and a lower notch 38, said upper notches being spaced apart a predetermined distance from said lower notch.

Notches 37 and 38 are of such size and shape as to be able to closely and fittingly accommodate the adjacent tip end of detent bar 36. The upper shelves 39 and 40 of notches 37 and 38 respectively, are slightly upwardly inclined, as shown. The upper edge of the adjacent tip end of detent lock bar 36 is beveled as at 41.

Lock bar 36 is longer in its overall length than the distance between the closest adjacent tangents of plunger rods 15 and 16. Therefore, when plunger rod 16 is actuated or depressed to accelerate the automobile (Fig. 2) lock bar 36 is pushed, by the rearmost edge of plunger rod 16, backward along the longitudinal axis of floor plate 11 and into the lower notch 38 of plunger rod 15.

Conversely, it will be seen (Fig. 3) that accelerator plunger rod 16 has a notch 42 cut therein, in that portion of said plunger rod 16 which faces toward the rear of the device. Notch 42 is of such size and shape as to be able to closely and fittingly accommodate the adjacent tip end of detent bar 36. The upper shelf 43 of notch 42 is slightly upwardly inclined, as shown. The upper edge of the adjacent tip end of detent bar 36 is beveled as at 44.

When accelerator plunger rod 16 is actuated or depressed with lock bar 36 pushed back as hereinabove described into lower notch 38 of brake plunger rod 15, it is impossible to actuate the brakes of the automobile since the upper shelf 40 of notch 38 would come into inhibiting contact with the upper edge of the rear tip of bar 36, if brake plunger rod 15 were attempted to be depressed. Thus, inadvertent application of the brakes of the vehicle at the same time that the vehicle is being accelerated is automatically prevented.

Similarly, once the brakes have been applied to any extent, as by actuating or depressing plunger rod 15 and causing lock bar 36 to slide forward and into slot or notch 42 of accelerator plunger rod 16, it is thereafter impossible to attempt to accelerate the vehicle by depressing plunger rod 16 since the upper shelf 43 of notch 42 would come into inhibiting contact with the upper surface of the adjacent tip of bar 36.

Further, if it is desired to lock the brakes in position and remove the foot from the foot pedal device of my invention, it is only necessary to actuate or depress brake plunger rod 15 a predetermined distance beyond initial braking, thereby positioning one of upper notches 37 of the same in alignment with bar 36; then depress plunger rod 16, thereby driving lock bar 36 rearward and into one of said upper notches 37, whereafter the spring bias 23 hereinabove referred to will push the lower shelf of notch 37 into inhibiting contact with the lower surface of the adjacent tip of lock bar 36. Said spring bias, causing brake plunger rod 15 to cooperate with lock bar 36 in the manner described, will maintain the brakes of the automobile in locked condition, until brake plunger rod 15 is depressed once again so as to drive lock bar 36 forward out of one of upper notches 37 in the brake plunger rod 15.

From the foregoing it will be appreciated that detent bar 36, in a sense, provides an operative connection between plunger rods 15 and 16 to accomplish the functions described.

The slight upward inclination of the upper shelves 39, 40, and 43, of notches 37, 38, and 42, it will be appreciated, facilitates driving said lock bar 36 forward or rearward out of the notches 37 and 38 in plunger rod 15, and notch 42 in plunger rod 16, respectively, whenever the appropriate adjacent plunger rod is depressed.

Thus it will be seen that the objects of my invention, hereinabove set forth, are conveniently attained by the mechanism herein shown and described.

The foregoing is not intended, however, to be limiting, but only descriptive, and that of only one form of my invention. It will be appreciated that various engineering and mechanical changes and adjustments may be made in the form described, without departing from the invention, which is claimed in the following claim.

I claim:

An automotive vehicle foot pedal comprising: a base plate adapted to be fixed upon the floor board of an automotive vehicle, said base plate being rectangular in shape with the long axis thereof parallel to the long axis of the automobile, and having, spaced apart along said long axis of said plate and at opposite ends thereof, two holes, normal to said base plate; bushings fixed in said holes; cylindrical plunger rods slideably and reciprocably mounted in said bushings; a foot plate pivotally mounted on the upper ends of said rods; stops fixed on said rods, said stops being adapted to engage the lower ends of said bushings so as to limit the upward movement of said rods, the lower end of one of said rods being connected to the braking system of said vehicle and the other of said rods being connected to the accelerator mechanism of said vehicle; spring means to bias said rods upwardly; an elongated detent bar slideably mounted on the top surface of said base plate, said detent bar being longer than the distance between adjacent tangents of said rods, said rods having, in facing portions thereof, notches adapted to receive, respectively, the adjacent tip ends of said detent bar, whereby, when said accelerator rod is actuated against said spring bias, said brake rod cannot be so actuated, and when said brake rod is actuated against said spring bias, said accelerator rod cannot be actuated except when said brake rod is so actuated a predetermined distance, in which case, when said accelerator rod is so actuated, said brake rod is, by the cooperation of said detent bar and said notches, locked in position.

References Cited in the file of this patent

UNITED STATES PATENTS

| 1,810,399 | Horni | June 16, 1931 |
| 2,042,202 | Althouse | May 26, 1936 |
| 2,258,627 | Siesennop | Oct. 14, 1941 |

FOREIGN PATENTS

| 757,915 | France | Oct. 23, 1933 |